United States Patent [19]

Black

[11] Patent Number: 4,709,444
[45] Date of Patent: Dec. 1, 1987

[54] WHEEL BRACKET MOUNTING STRUCTURE

[75] Inventor: John W. Black, Hickory Corners, Mich.

[73] Assignee: Standex International Corporation, Salem, N.H.

[21] Appl. No.: 9,019

[22] Filed: Jan. 28, 1987

Related U.S. Application Data

[63] Continuation of Ser. No. 875,523, Jun. 19, 1986, abandoned, which is a continuation of Ser. No. 541,599, Oct. 13, 1983, abandoned.

[51] Int. Cl.⁴ .............................................. B60B 33/00
[52] U.S. Cl. ........................................ 16/31 A; 16/44; 16/18 R; 16/18 A
[58] Field of Search ................. 16/31 R, 31 A, 18 R, 16/29, 18 A, 40, 44

[56] References Cited

U.S. PATENT DOCUMENTS

| 1,677 | 4/1880 | Jones | 16/18 R |
|---|---|---|---|
| 32,224 | 2/1900 | Clark | 16/31 R |
| 568,025 | 9/1896 | Graessle . | |
| 932,038 | 8/1909 | Maier | 16/45 |
| 1,541,280 | 6/1925 | Replogle | 16/30 |
| 1,836,246 | 12/1931 | Harold . | |
| 2,051,627 | 8/1936 | Weinmauer | 16/18 R |
| 2,184,038 | 12/1939 | Dayton . | |
| 2,304,378 | 12/1942 | Scudder et al. . | |
| 2,338,294 | 1/1944 | Maule . | |
| 2,500,854 | 3/1950 | Mullen et al. | 16/31 R |
| 2,524,236 | 10/1950 | Schultz, Jr. | 16/31 R |
| 2,533,403 | 12/1950 | Schultz | 16/18 R |
| 2,799,041 | 7/1957 | Baker | 16/40 |
| 2,987,752 | 6/1961 | Black | 16/44 |
| 3,528,635 | 9/1970 | Nightingale | 16/29 |

FOREIGN PATENT DOCUMENTS

| 939462 | 1/1974 | Canada | 16/31 R |
|---|---|---|---|
| 1179632 | 5/1959 | France . | |
| 1312550 | 11/1961 | France . | |
| 445763 | 10/1967 | Switzerland . | |

Primary Examiner—Paul A. Bell
Assistant Examiner—James L. Wolfe
Attorney, Agent, or Firm—Flynn, Thiel, Boutell & Tanis

[57] ABSTRACT

A wheel bracket mounting structure which includes an elongated and flexible bracket member having an axle mounting section and a stem mounting section at generally opposite ends thereof. The axle mounting section includes a generally flat, platelike portion. The stem mounting section includes an elongate, generally arcuate stem adapted to be directly attached to a support member on a wheeled vehicle. An intermediate section is provided between the axle mounting section and the stem mounting section. A segment is provided at the juncture between the intermediate section and the flat, platelike portion to provide a region remote from the arcuate stem about which the platelike portion can elastically flex relative to the arcuate stem.

23 Claims, 21 Drawing Figures

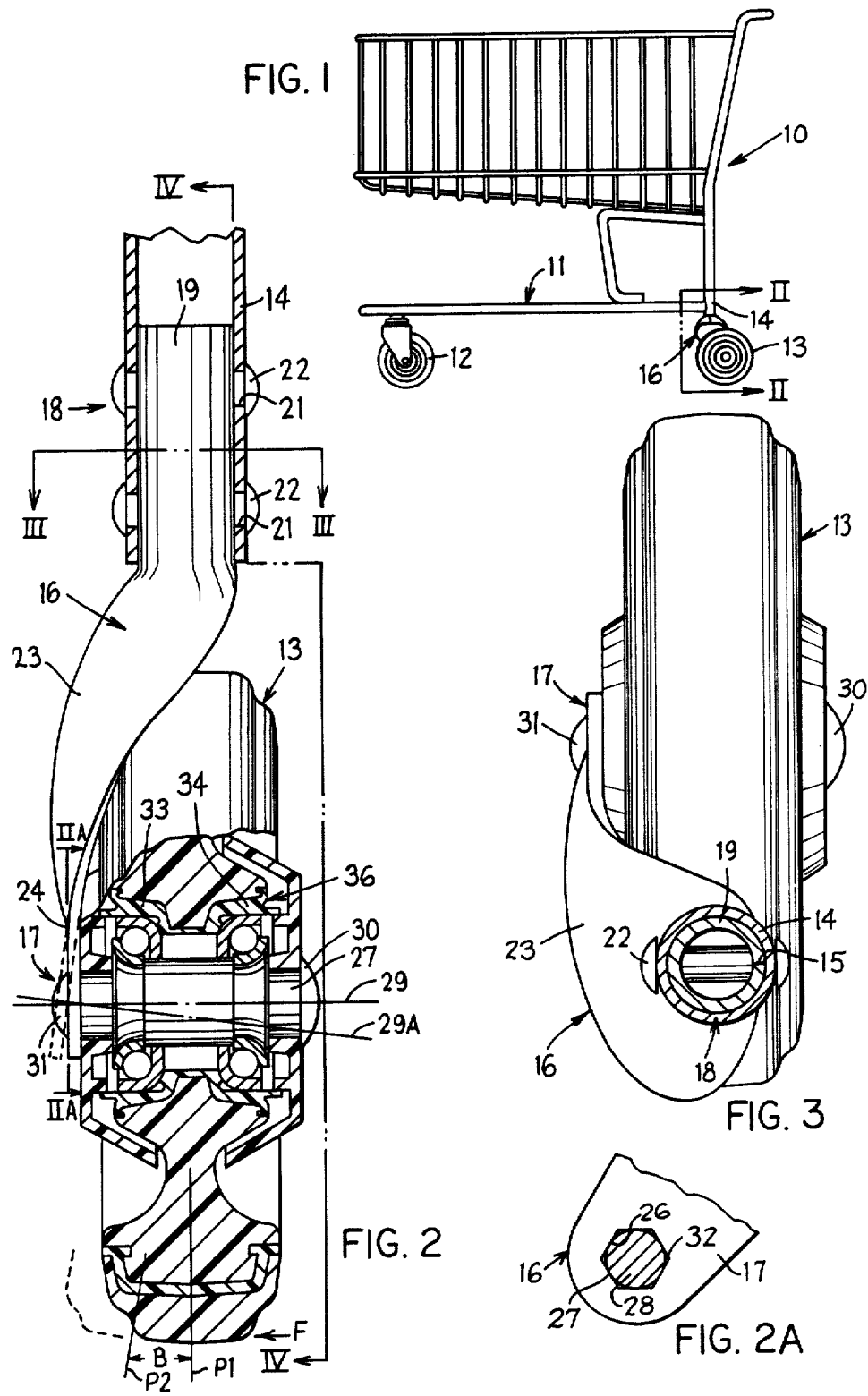

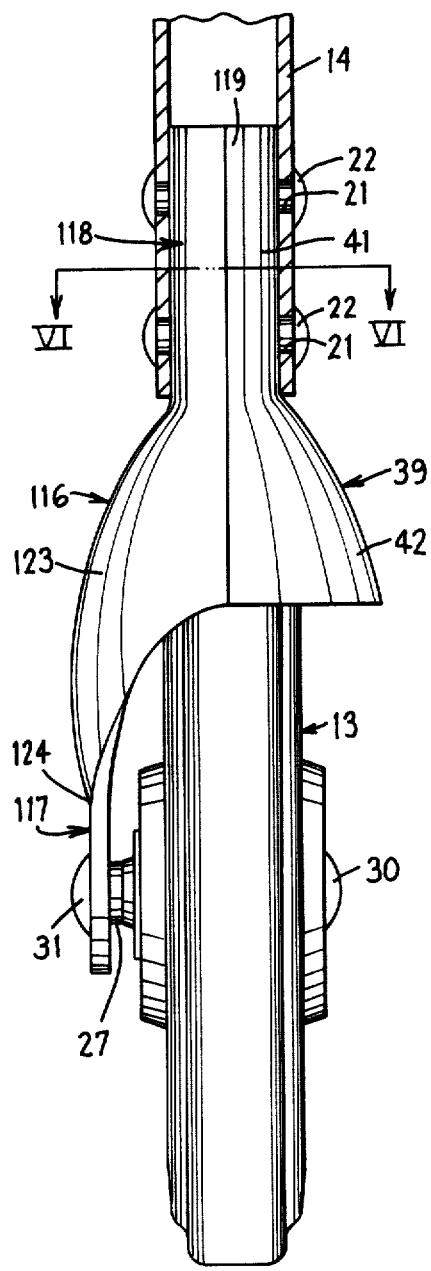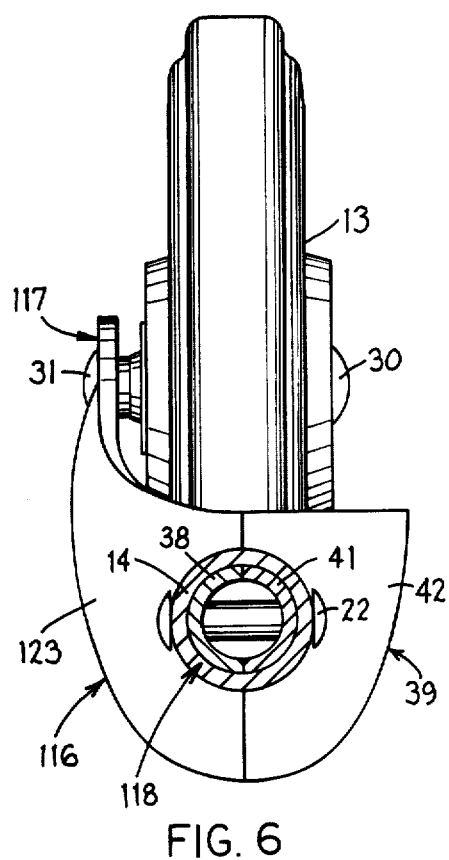
FIG. 5
FIG. 6

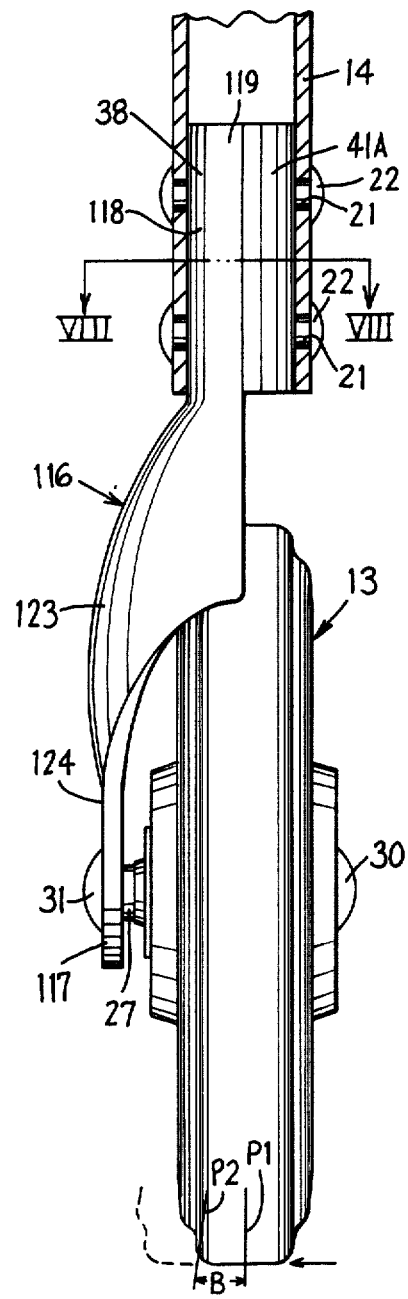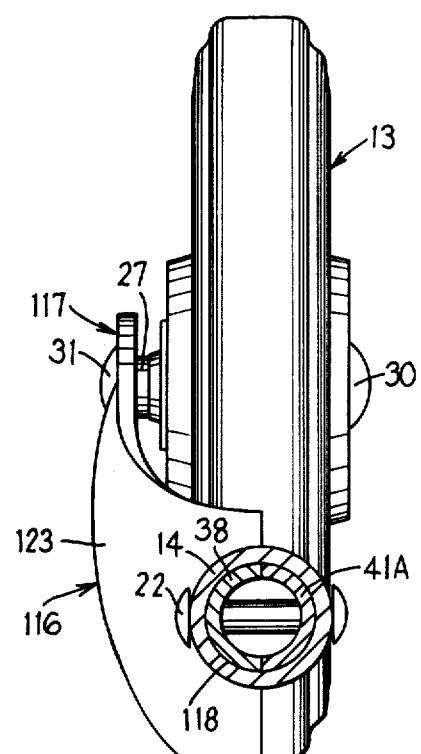
FIG. 7
FIG. 8

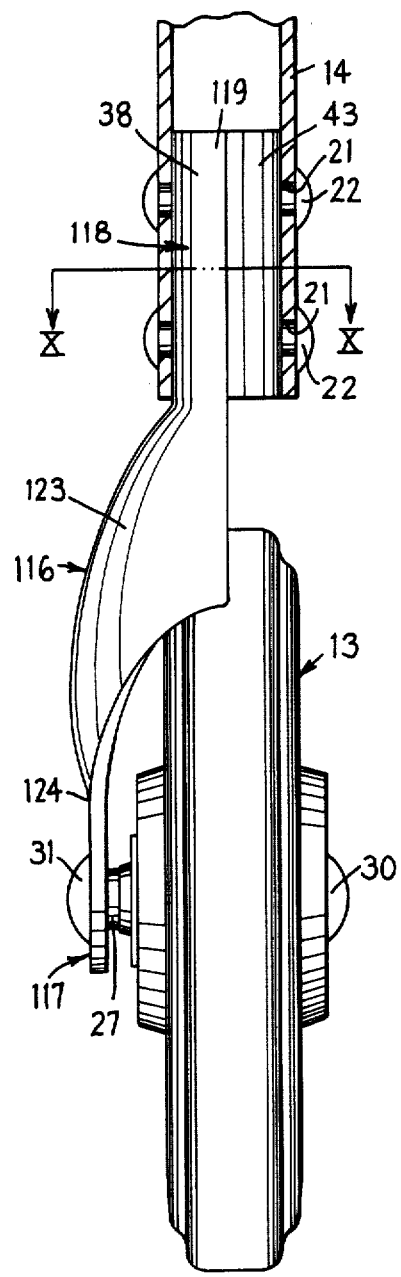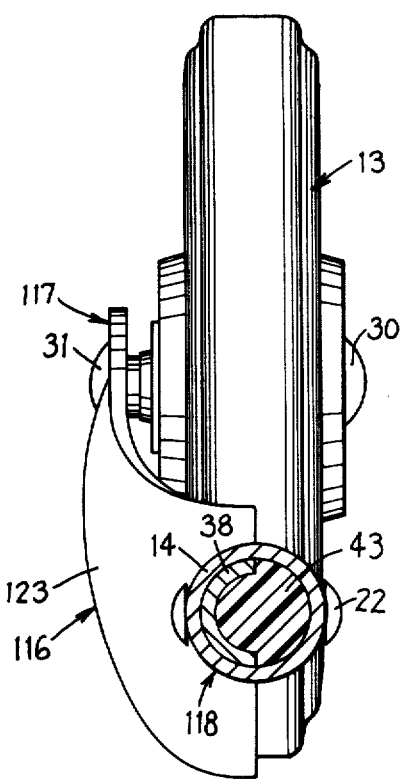
FIG. 9
FIG. 10

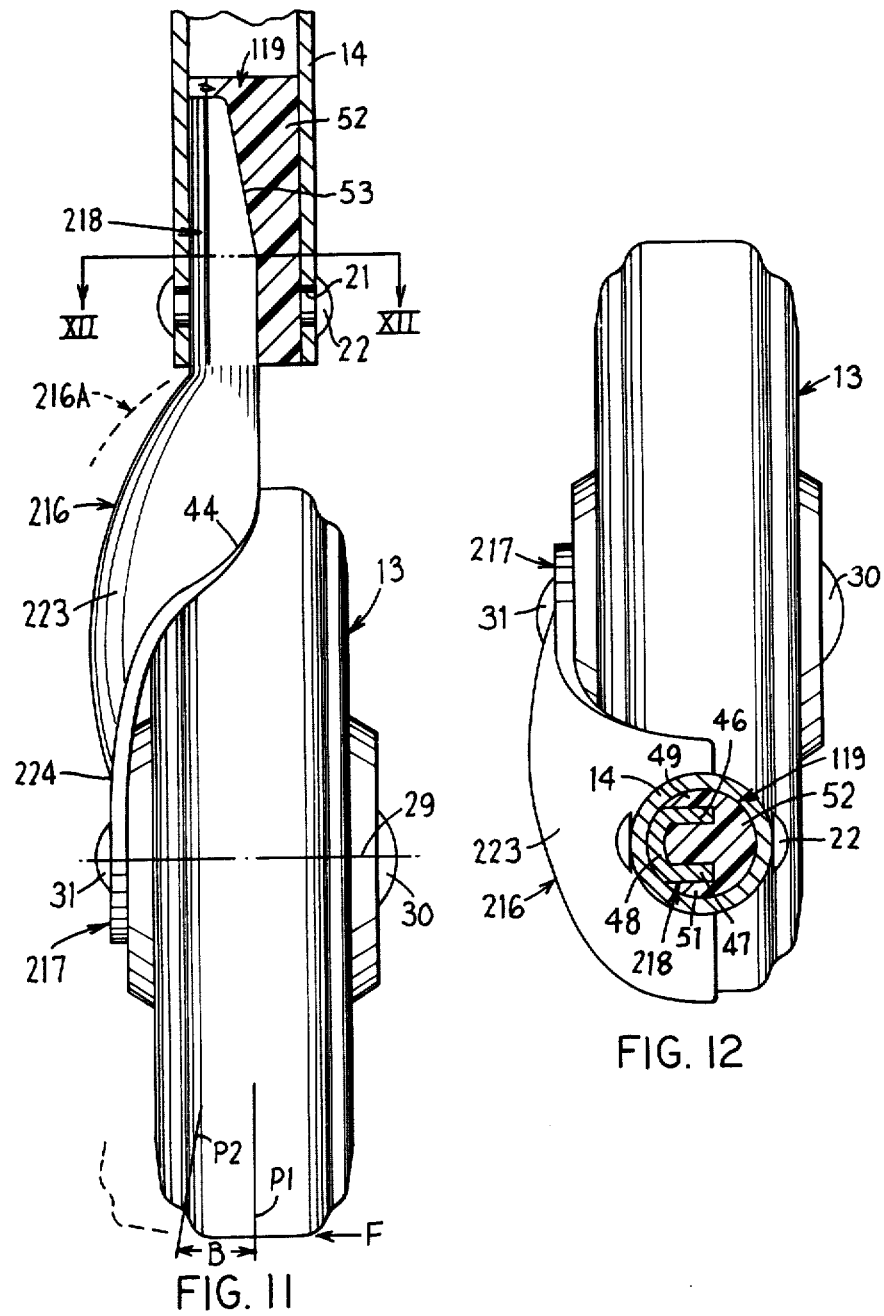

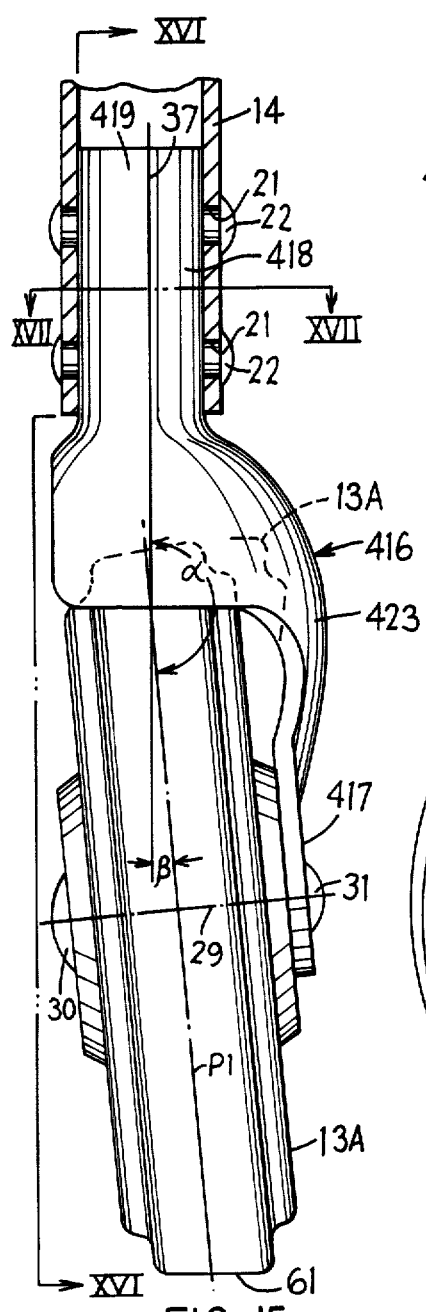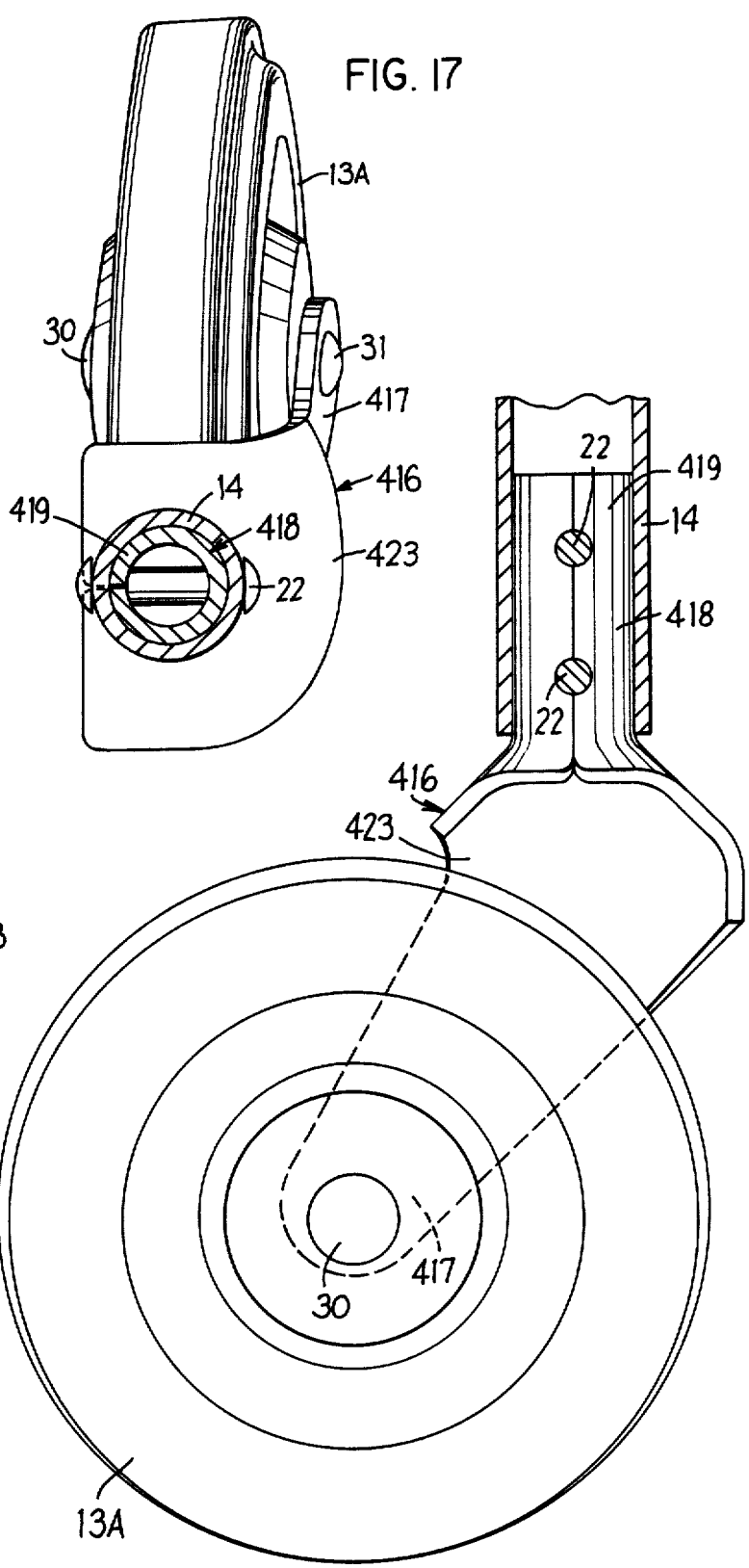
FIG. 17
FIG. 15
FIG. 16

WHEEL BRACKET MOUNTING STRUCTURE

CROSS REFERENCE TO RELATED APPLICATION

This application is a continuation of U.S. Ser. No. 875,523 filed June 19, 1986, now abandoned which is a continuation of U.S. Ser. No. 541,599 filed Oct. 13, 1983, now abandoned.

FIELD OF THE INVENTION

This invention relates to a wheel bracket mounting structure and a method for making it, and more particularly to a wheel bracket mounting structure having a single bracket part preferably made by a single stamping step and from which the axle is cantilevered.

BACKGROUND OF THE INVENTION

Wheel bracket assemblies, which include a wheel bracket and a wheel rotatably supported on the bracket, are utilized in many applications, for example on shopping carts. In applications of this type, the wheel bracket assembly is frequently subjected to rough treatment and therefore must be durable and reliable. However, in industries which are highly competitive, it is also important that the wheel bracket assembly be relatively inexpensive in order to minimize the overall cost of the final product.

One conventioral wheel bracket assembly used in applications of this type includes U-shaped horn with the wheel rotatably supported between its legs, and a pin which is riveted in an opening in the bight of the horn and has transverse holes drilled therethrough. Although this convenvional arrangement has been adequate for its intended purposes, it has not been satisfactory in all respects. In particular, several separate manufacturing steps are required to fabricate the wheel bracket, thus making the wheel bracket assembly relatively expensive. Further, the connection between the pin and horn is subjected to relatively large stresses and frequently tends to loosen over a period of time.

A further consideration is that it is usually desirable for a wheel bracket assembly of the foregoing type to have a small amount of pivoting and shock-absorbing capability when mounted on a shopping cart or other device, in order to minimize the stresses applied to the bearings. However, conventional arrangements which provide limited pivoting and/or shock-absorbing capability typically involve increased structural complexity of the wheel bracket assembly and thus an increased number of manufacturing steps to fabricate the wheel bracket assembly.

Accordingly, an object of the present invention is to provide a wheel lracket mounting structure which is simple in structure and is relatively simple and inexpensive to manufacture.

A further object of the invention is to provide a wheel bracket mounting structure, as aforesaid, which can be fabricated with a minimum number of steps and with a minimal amount of labor.

A further object of the invention is to provide a wheel bracket mounting structure, as aforesaid, which is rugged and durable and requires little or no maintenance over its useful lifetime.

A further object of the invention is to provide a wheel bracket mounting structure, as aforesaid, which has an aesthetically pleasing appearance and preferably a somewhat streamlined shape.

A further object of the invention is to provide a wheel bracket mounting structure, as aforesaid, which has a shock-absorbing capability when mounted on a shopping cart or similar wheeled vehicle.

A further object of the invention is to provide a wheel bracket mounting structure, as aforesaid, wherein the bracket structure is rendered elastically movable relative to the structure on which it is mounted to further enhance the shock-absorbing capability of the wheel bracket mounting structure.

A further object of the invention is to provide a wheel bracket mounting structure, as aforesaid, wherein the axle is secured to the bracket member at only one end thereof.

SUMMARY OF THE INVENTION

The objects and purposes of the broadest aspect of the invention, including those set forth above, are met by providing a wheel bracket mounting structure which includes an elongated and flexible bracket member having an axle mounting section and a stem mounting section at generally opposite ends thereof. The axle mounting section includes a first structure defining a generally flat, platelike portion. The stem mounting section includes second structure defining an elongate, generally arcuate stem adapted to be directly attached to a support member on a wheeled vehicle. The bracket member further includes third structure intermediate the aforesaid first and second structure for providing a smooth transition between the first and second structures. The third structure includes a segment adjacent the platelike portion for providing a region remote from the arcuate stem about which the platelike portion can elastically flex relative to the arcuate stem. The objects and purposes are also met by providing a method of making the bracket member, as aforesaid.

BRIEF DESCRIPTION OF THE DRAWINGS

The subject matter of the invention will be described in more detail hereinafter in connection with the exemplary embodimemts illustrated in the drawings, in which:

FIG. 1 is a side view of a wheel supported vehicle, namely, a shopping cart having a wheel bracket mounting structure embodying the invention mounted thereon;

FIG. 2 is an enlarged front view of a wheel bracket mounting structure embodying the invention and taken along the, line II—II of FIG. 1;

FIG. 2A is a fragmentary sectional view taken along the line IIA—IIA in FIG. 2;

FIG. 3 is a sectional view taken along the line III—III of FIG. 2.

FIG. 5 is a front elevational view of a second embodiment of the wheel bracket mounting structure;

FIG. 6 is a sectional view taken along the line VI—VI of FIG. 5;

FIG. 7 is a front elevational view of a third embodiment of the wheel bracket mounting structure embodying the invention;

FIG. 8 is a sectional view taken along the line VIII—VIII of FIG. 7;

FIG. 9 is a front elevational view of a fourth embodiment of the wheel bracket mounting structure embodying the invention;

FIG. 10 is a sectional view taken along the line X—X of FIG. 9;

FIG. 11 is a front elevational view of a fifth embodiment of the wheel bracket mounting structure embodying the invention;

FIG. 12 is a sectional view taken along the line XII—XII of FIG. 11;

FIG. 15 is a front elevational view of a seventh embodiment of the wheel bracket mounting structure embodying the invention;

FIG. 16 is a sectional view taken along the line XVI—XVI of FIG. 15;

FIG. 17 is a sectional view taken along the line XVI—XVI of FIG. 15;

Figure 4:
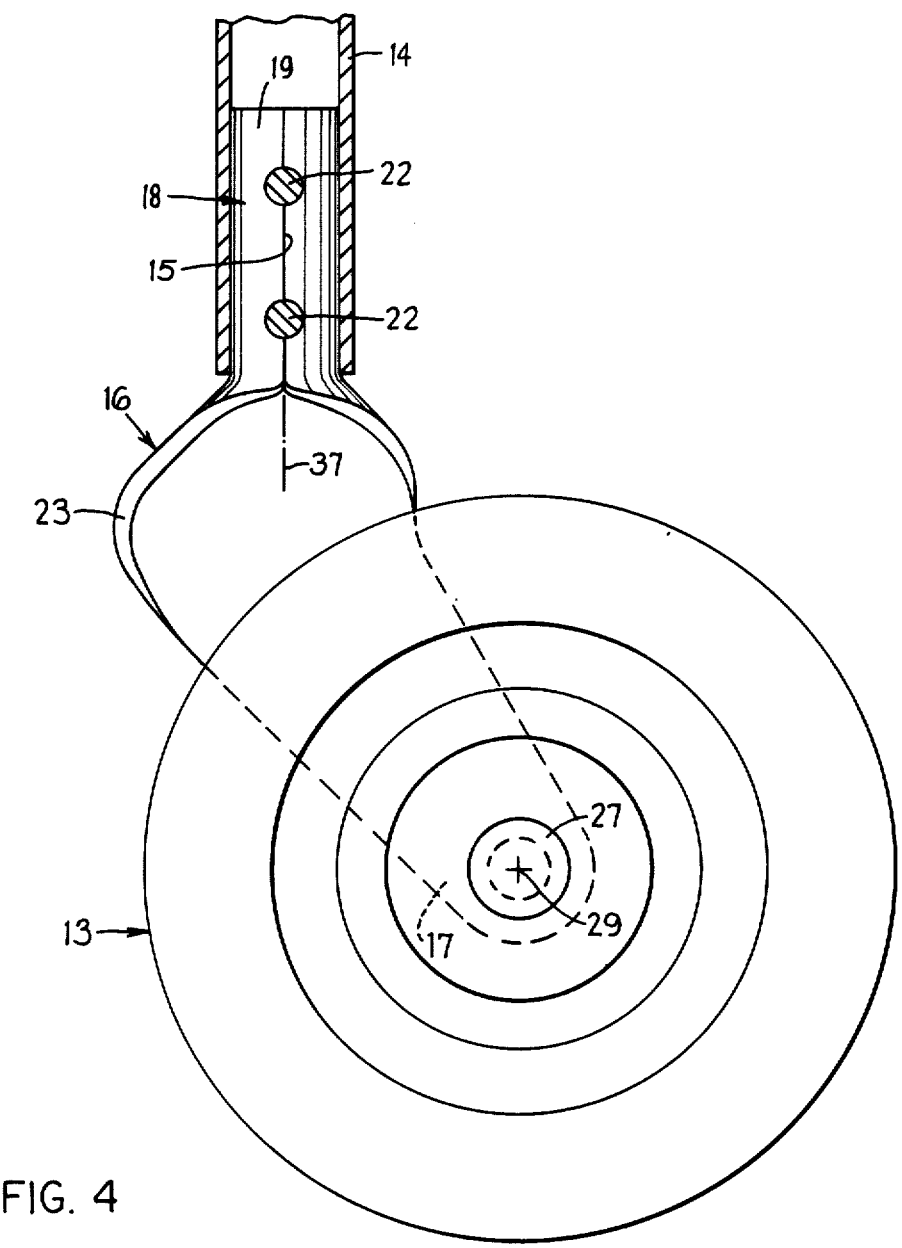
FIG. 4 is a sectional view taken along the line IV—IV of FIG. 2.

Certain terminology is used in the following description for convenience in reference only and is not to be considered limiting. For example, the words "up", "down", "front" and "rear" will designate directions in the drawings to which reference is made. The words "in" and "out" will respectively refer to directions toward and away from the geometric center of the wheel bracket mounting structure and designated parts thereof. Such terminology will include the words specifically mentioned above, derivatives thereof and words of similar import.

DETAILED DESCRIPTION

A conventional type of wheeled vehicle 10 is illustrated in FIG. 1. The wheeled vehicle is comprised of a base frame 11 having the usual pivotal or castored front wheels 12 and fixed or stationary rear wheels 13. In this particular embodiment, the rear wheels 13 include a wheel bracket mounting structure which embodies the invention and, accordingly, the following discussion will be directed to the various embodiments of the rear wheel bracket mounting structure. Of particular importance is the downwardly extending and opening tubular segment 14 of the base frame 11, since it is to this segment that the wheel bracket mounting structure is secured.

Referring to FIG. 2, the lower portion of the tubular segment 14 is illustrated therein. As stated above, the tubular segment 14 is the part of the base frame 11 to which the wheel bracket mounting structure is secured. More specifically, the wheel bracket mounting structure includes an elongated and flexible bracket member 16 having at opposite ends thereof an axle supporting section 17 and a stem section 18. In all embodiments described hereinafter, the bracket member 16 is formed from a single piece of metal of uniform thickness, preferably a high carbon steel plate such as type C-1065 and, after the stamping operation, is preferably heat treated and drawn to give it a Rockwell hardness ir the range of 45 to 55 Rockwell C and preferably 48 to 52 Rockwell C. This essentially converts the bracket member to spring steel. The thus-increased tensile strength of the steel will enable the steel to withstand substantial shock loads without any plastic deformation.

In the embodiment of FIGS. 2 to 4, the stem section 18 is formed into a split cylinder 19. The diameter of the cylinder 19 is equal to or initially slightly greater than the internal diameter of the tubular segment 14 in the base 11 of the wheeled vehicle 10. If the cylinder 19 is initially larger in diameter than the internal diameter of the tubular segment 14, there will normally be a space provided between the mutually adjacent edges thereof, as at 15, to enable the assembler or installer to pinch the edges together so that the effective diameter becomes less than the internal diameter of the tubular segment to facilitate an insertion of the cylinder 19 into the tubular segment 14. Thereafter, the edges will separate due to the resilience of the steel to snugly hold the cylinder in the tubular segment. The cylinder 19 has a sufficient length to be received a substantial distance inside the tubular segment 14 as illustrated in FIG. 2. In this particular embodiment, a pair of vertically spaced and aligned holes 21 are provided in both the tubular segment 14 and the cylinder 19, each receiving a rivet 22 therein to securely hold the cylinder 19 to the tubular segment 14 and to prevent relative rotation therebetween.

An intermediate section 23 is provided on the bracket member between the axle mounting section 17 and the stem section 18. The intermediate section flares smoothly downwardly and laterally outwardly from the lower end of the stem section 18, is bulbously curved in a manner such that the centerpoints of all radii of curvature lie on the side of said bracket member adjacent said wheel, and increase in width in a direction away from the stem segment 18. There are no sharp corners in the intermediate section. That is, the intermediate section 23 has a rounded contour to prevent elastic flexing occurring at the juncture between the intermediate section 23 and the stem section 18 as well as along the length of the intermediate section. It is desirable for there to be a rigid relationship between the stem section 18 and the intermediate section 23. The intermediate section then becomes less wide, preferably uniformly tapers toward the axle mounting section 17.

The axle mounting section 17 is contiguous with the lower portion of the intermediate section 23 and is horizontally and vertically offset from the stem section 18. The axle mounting section 17 is generally a flat, plate-like portion extending in a plane parallel to the central axis 37 of the cylinder 19. The juncture between the axle mounting section 17 and the intermediate section 23, namaly at 24, defines a region whereat elastic flexing is desirable. The intermediate section 23 has, therefore, a greater resistance to lateral elastic flex than the region indicated by the reference character 24. The purpose of this particular structure will be explained below.

The axle mounting section has a noncircular opening 26 punched therethrough (see FIG. 2A). A solid axle member 27 is provided and has a necked down-portion 28 received in the noncircular opening 26 as shown in FIG. 2A. The axis 29 of the axle 27 is oriented preferably perpendicular to the plane of the flat, platelike, axle mounting section 17. The material of the necked down-portiion 28 is deformed into a rivet head 31. Simultaneously during this forming of the rivet head 31, the metal is caused to flow and fill the voids 32 (FIG. 2A) of the noncircular opening 26 to fixedly and rigidly lock the axle 27 to the axle mounting section 17. An enlargement 30 is provided on the axis 27 at the free end thereof to prevent or stop the wheel 13 from moving axially away from the bracket member 16.

As shown in FIG. 4, the axis 29 is offset horizontally and to the rear of the central axis 37 of the cylinder 19.

In this particular embodiment, the axle 27 is identical to the ax;e disclosed in my U.S. Pat. No. 4,318,204. In fact. the entirety of the wheel 13 including the axle therefor is identical to the wheel disclosed in my aforementioned patent. Accordingly, reference thereto is to be incorporated herein. It is, of course, to be understood that other wheel constructions can also be utilized in combination with the bracket member described hereinabove without departing from the scope of the invention. In other words, the disclosure is not to be considered limited to the particular wheel shown in FIG. 2. Thus, a detailed discussion of the particular characteristics of the wheel is deemed unnecessary.

In addition to the relative flexing movement that is permitted between the plane of rotation of the wheel 13 relative to the axis 29 permitted by the thick and elastic segments 33 and 34 of the liner 36, and as described in my aforementioned U.S. Pat. No. 4,318,204, a flexing of the axle mounting section 17 relative to the intermediate section 23 is permitted to facilitate a flexing movement of the axis 29 to a secondary position illustrated by the reference 29A. This particular feature of my bracket member becomes important for the following reasons. In use of the wheel bracket mounting structure which includes the aforementioned bracket member 16 and axle 27 mounted thereon combined with the particular features of the axle mounting section 17 and stem section 18, both of which are isolated by an intermediate section 23, severe loads are applied to the wheel, particularly in an axial direction as opposed to the normal loads applied in the radial direction. These axial loads are generally caused by the user of a wheeled vehicle, such as a shopping cart, pushing on the vehicle handle in a direction which causes a load to be applied to the tread of the wheel as indicated by the arrow F in FIG. 2. While the aforementioned thick and elastic segments 33 and 34 of the liner 36 have been heretofore sufficient to compensate for this type of load, it has been discovered that in certain situations additional loads have been applied to the wheel bracket assemblies used heretofore and have resulted in a plastic deformation of the bracket member. My invention, however, is to provide structure which will enable further compensation of these additional loads applied to the overall wheel bracket mounting structure. In my arrangement, I provide for an elastic flexing to occur at the region 24 between the intermediate section 23 and the axle mounting section 17 of the bracket member 16 enabling the axis 29 to shift temporarily under severe load to the alternate position illustrated by the reference character 29A. This flexing will be in addition to the flexing that I normally provide when wheels are used which are capable of such flexing movement, particularly those wheels disclosed in my U.S. Pat. No. 4,318,204 Re. U.S. Pat. No. 31,110. Both of the wheel stuctures disclosed in these patents have solid axles. However, it is to be recognized that axle structures such as is disclosed in my U.S. Pat. No. 4,072,373 are capable of use with this invention, it being recognized that the axle must be fixedly secured to the axle mounting section 17.

During testing of the wheel bracket mounting structure described hereinabove, certain surprising results were achieved. For example, and referring to the structure disclosed and claimed in my copending application Ser. No. 488,863, filed Apr. 26, 1983, a series of loads were applied to the tread of the wheel at a location corresponding to the location indicated by the reference arrow F in FIG. 2 herein. The amount of flex was then measured (distance B) to indicate the amount of elastic flexing that was permitted between the normal plane of rotation P1 and a secondary plane of rotation P2 caused by the application of the force so indicated. The following chart indicates the results as applied to the structure disclosed in my aforementioned application Ser. No. 488,863, particularly FIG. 2 therein, and utilizing a 5 inch diameter wheel.

| F (pounds) | B (deflection in inches) |
|---|---|
| 10 | .065 |
| 20 | .122 |
| 30 | .205 |
| 40 | .284 |
| 50 | .385 |
| 60 | .467 |
| 70 | .570 |
| 80 | .653 |
| 90 | .748 |
| 100 | .853 |

The structure of FIGS. 2 to 4 were subjected to the same test, using the same wheel, and the following results were achieved, also utilizing a 5 inch diameter wheel:

| F (pounds) | B (deflection in inches) |
|---|---|
| 10 | .168 |
| 20 | .298 |
| 30 | .415 |
| 40 | .555 |
| 50 | .705 |
| 60 | .845 |
| 70 | 1.050 |
| 80 | 1.230 |
| 90 | 1.395 |
| 100 | 1.580 |
| 110 | 1.775 |

The unexpected increase in the amount of deflection permitted by the structure of FIGS. 2 to 4 has enhanced the durability of the bracket member 16 and enables same to be subjected to severe loads without plastically deforming the bracket member. When the bracket member 16 is employed on wheels used on shopping carts, clerks returning shopping carts to the interior of the store, by first gathering plural carts in a nested relationship in the parking lot and pushing them, one nested within the other, oftentimes encounter locations whereat the entire nested arrangement of shopping carts must be turned at a right angle. It is at this point in time that a severe load is applied to the wheel at the location indicated by the reference arrow F in FIG. 2. It is also at this point in time that a severe load is applied to the wheel bracket mounting structure. The provision of the bracket member which I have described above in reference to FIGS. 2 to 4 enables the wheel bracket mounting structure to withstand the severe load and, following a termination of the severe load, return to its normal position enabling the wheel 13 to return to its proper plane of rotation P1.

In reference to this testing, the metal employed for the bracket member 16 was 11-gauge (0.120 inches thick) and the internal diameter of the tubular segment 14 was 0.720 inches in diameter. The metal used in the testing of the arrangement disclosed in my aforementioned application Ser. No. 488,863 employed a metal having a 12-gauge thickness (0.104 inches thick) and the internal diameter of the tubular segment was, as with the embodiment disclosed in FIGS. 2 to 4 of this application, 0.720 inches in diameter.

ALTERNATE EMBODIMENT OF FIGS. 5-6

The embodiment of FIGS. 5 and 6 is similar to the embodiment of FIGS. 2 to 4 described above. Therefore, the same reference numerals will be used to designate similar or identical structure described above in relation to FIGS. 2 to 4 but with a "1" prefix added thereto. That is, the bracket member 116 is composed of an axle mounting section 117 and a stem section 118 separated by an intermediate section 123. As with the embodiment of FIGS. 2 to 4, the intermediate section 123 has a greater resistance to elastic flex than does the juncture 124 between the intermediate section 123 and the axle mounting section 117. In this particular embodiment, the stem section 118 is not cylindrical in shape but is, instead, semicylindrical in shape as shown at 38 in FIG. 6. To form a cylinder, the same as the cylinder 19 in the embodiment of FIGS. 2 to 4, an additional skirt member 39 is formed having a stem section 41 thereon which is semicylindrical in shape, which when placed in mating relationship with the semicylindrical portion 38 of the stem section 118 forms a cylinder 119. The cylinder 119 is received in the tubular segment 14 and is secured in place by plural rivets 22 received in aligned openings 21 in the tubular segment 14 and the cylinder 119. In this particular embodiment, the skirt 39 has a lower segment 42 that conforms to the shape of the upper part of the intermediate section 123 so as to match the upper extremity of the intermediate part 123 to provide continuity in the aesthetic appearance. It is to be noted that the skirt terminates at a location above the axle.

ALTERNATE EMBODIMENT OF FIGS. 7-8

The embodiment of FIGS. 7 and 8 is generally the same as the embodiment of FIGS. 5 and 6 and, as a result, the same reference numerals have been utilized as were utilized in the description of FIGS. 5 and 6 which, in some instances, may have the suffix "A" added thereto to indicate the slight modification. The lower portion 42 of the skirt member 39 has been eliminated in this embodiment leaving only the semicylindrical section 41A which, when mated with the semicylindrical portion 38 of the bracket member 116 forms a cylinder 119.

The wheel bracket mounting structure of FIGS. 7 and 8 were subjected to the same testing discussed above, and using a 5 inch diameter wheel, with the following results:

| F (pounds) | B (deflections in inches) |
|---|---|
| 10 | .225 |
| 20 | .535 |
| 30 | .775 |
| 40 | 1.060 |
| 50 | 1.380 |
| 60 | 1.690 |
| 70 | 1.965 |
| 75 | 2.215 |

It was observed that the primary difference between the amount of flexing for the embodiment of FIGS. 7 and 8 and the embodiment of FIGS. 2 to 4 was due to a thinner gauge material being utilized for this embodiment. That is, the embodiment of FIGS. 2 to 4 utilized an 11-gauge material (0.120 inches thick) as compared to a 12-gauge material being utilized in this embodiment (0.104 inches thick). This particular construction seemed to withstand the severe loading up to at least 75 pounds without any permanent plastic deformation of the metal.

ALTERNATE EMBODIMENT OF FIGS. 9-10

The embodiment of FIGS. 9-10 is closely similar to the embodiment of FIGS. 7 and 8 described above and, as a result, the same reference numerals have been utilized to designate the identical components. That is, the bracket member 116 is identical to the bracket member 116 in this particular embodiment. The primary difference between this embodiment and the embodiment of FIGS. 7 and 8 is the provision of an elastomeric member 43 which is shaped to fill the interior of the C-shaped contour of the semicylindrical portion 38 of the stem section 118 as well as fill out the remainder of the interior of the tubular segment 14. Thus, the outer extremity of both the semicylindrical segment 38 and the elastomeric member 43 is cylindrical to thereby define the cylinder 119. Appropriate openings are provided through the elastomeric member 43 to facilitate the rivets 22 securing the bracket member 16 and cooperating elastomeric member 43 to the interior of the tubular segment 14.

The elastomeric member in this embodiment, as in all other embodiments described herein, is made of a polyurethane having a hardness value in the range of 75 Shore A to 55 Shore D Durometer.

ALTERNATE EMBODIMENT OF FIGS. 11-12

The embodiment of FIGS. 11 and 12 is similar to the embodiment of FIGS. 9 and 10. Therefore, the same reference numeral will be used to designate similar or identical structure described above in relation to FIGS. 2 to 4 but with a "2" prefix added thereto. There is a slight variation, however, in the specific shape of the bracket member 216, particularly the shape of the intermediate segment 223 wherein a rounded corner at 44 is provided whereas in the embodiment of FIGS. 9 and 10 a rather sharp corner is provided. In addition, the stem section 218 is shaped slightly differently from the embodiment of FIGS. 9 and 10. In this particular embodiment, the stem segment 218 is somewhat C-shaped having a pair of parallel legs 46 and 47 which extend in parallel planes which are both parallel to an upright vertical plane extending through the axis 29. The legs 46 and 47 are connected by a bight section having an exterior surface that is arcuate and corresponds to the arcuate contour of the interior of the tubular segment 14. Further, a space 49 is provided between the exterior of the leg 46 and the interior of the tubular segment 14 as well as a space 51 between the exterior of the leg 47 and the interior of the tubular segment 14 as best illustrated in FIG. 12. An elastomeric member 52 is provided and is adapted to fill the space between the parallel legs 46 and 47 as well as the spaces 49 and 51 and, further, the remainder portion of the interior of the tubular segment 14 to define a cylinder 119. The exterior surface of the cylinder 119 is composed of two parts, namely, the exterior surface of the bight 48 as well as the exterior surface of the elastomeric member 52 as best illustrated in FIG. 12.

The elastomeric member in this embodiment, as in all other embodiments described herein, is made of a polyurethane having a hardness value in the range of 75 Shore A to 55 Shore D Durometer.

In this particular embodiment, the bight section 48 is provided with a single hole therethrough which is aligned with the single set of aligned holes 21 provided in the tubular segment 14 so that a single rivet 22 effects a securing of the stem section 218 to the tubular segment 14. In this particular embodiment, the hole through the bight 48 is slightly larger than the diameter of the central portion of the rivet so that the entirety of the bracket member 216 will move relative to the tubular segment 14 against the resilient urging of the elastomeric member 52. It is to be noted that each of the legs 46 and 47 each have an edge 53 thereon which is inclined to the vertical as best illustrated in FIG. 11. The edge effectively constitutes a removal of material from the legs 46 and 47 to facilitate further relative movement between the bracket member 216 and the tubular segment 14. That is, the bracket member 216 is movable, for example, to the broken line position illustrated in FIG. 11 about an axis oriented perpendicular to the axis of the rivet 22 against the resilient urging of the elastomeric member 52.

The wheel bracket mounting structure of FIGS. 11 and 12 was subjected to the same type of testing as was the previously discussed embodiments of FIGS. 2 to 4 and FIGS. 7 and 8. The following are the test results derived from the test. A 5 inch diameter wheel was used in this testing.

| F (pounds) | B (deflection in inches) |
|---|---|
| 10 | .360 |
| 20 | .695 |
| 30 | .965 |
| 40 | 1.325 |
| 50 | 1.610 |
| 60 | 2.050 |
| 70 | 2.388 |
| 80 | 2.800 |
| 85 | 3.000 |
| 100 | 4.500 |

Additional force was applied to the wheel until a maximum deflection of 5 inches was achieved and without any plastic deformation of the bracket.

The material of the bracket member 216 was 11-gauge steel. The spacing between the exterior surfaces of the parallel legs 46 and 47 was 0.500 inches and the distance from the midportion of the exterior surface of the bight 48 to the axially facing edges of the legs 46 and 47 adjacent the juncture between the stem section 218 and the intermediate section 223 was 0.425 inches. The interior diameter of the tubular segment was the same as the previous embodiments, namely, 0.720 inches.

ALTERNATE EMBODIMENT OF FIGS. 13-14

Figure 13:
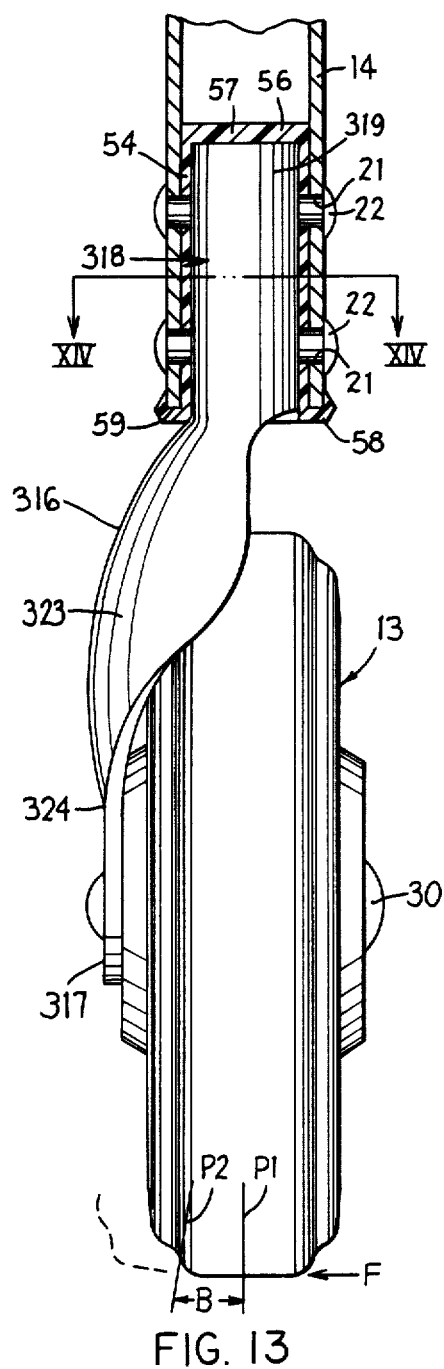
FIG. 13 is a front elevational view of a sixth embodiment of the wheel bracket mounting structure embodying the invention.
Figure 14:
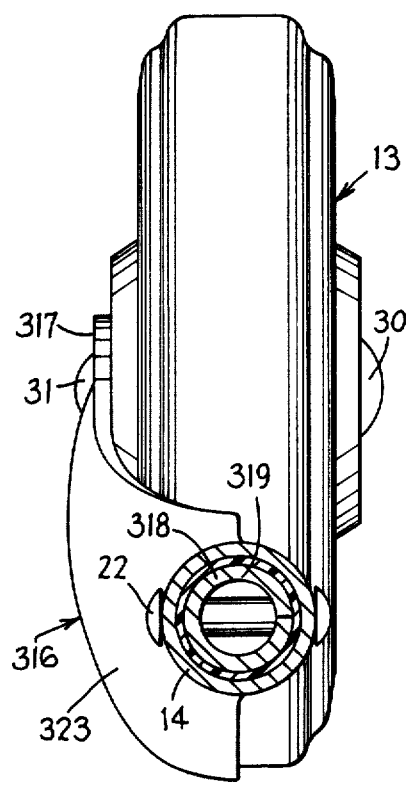
FIG. 14 is a sectional view taken along the line XIV-XIV of FIG. 13.

The embodiment of FIGS. 13 and 14 is similar in many respects to the embodiment of FIGS. 2 to 4 and, as a result, the same reference numerals will be used to designate similar or identical structure described in relation to FIGS. 2 to 4 but with a "3" prefix added thereto. The bracket member 316 has a cylindrically shaped stem section 318 separated from the axle mounting segment 317 by an intermediate segment 323. The cylinder 319 of the stem section 318 has a diameter that is less than the interior diameter of the tubular segment 14 thereby defining a space 54 therebetween. An elastomeric sleeve is provided and fills the space 54 between the exterior surface of the cylinder 319 and the interior surface of the tubular segment 14. In this particular embodiment, the sleeve 56 has a cylindrical body part and a closed end section 57. For decorative purposes, a radially outwardly extending annular lip 58 is provided and grips over and covers the lower annular edge 59 of the tubular segment 14. A pair of vertically spaced and parallel openings are provided in the cylinder 319 as well as in the wall of the tubular segment 14 and the cylindrical shell portion of the elastomeric sleeve 56 so as to facilitate the reception therein of rivets 22 to effect a securement of the stem section 318 to the tubular segment 14.

The elastomeric member in this embodiment, as in all other embodiments described herein, is made of a polyurethane having a hardness value in the range of 75 Shore A to 55 Shore D Durometer.

As with the embodiments of FIGS. 2 to 4, FIGS. 7 and 8 and FIGS. 11 and 12, this embodiment was also subjected to a test wherein a force was applied to the tread of the wheel 13 in direction of the arrow F illustrated in FIG. 13. The amount of deflection B was measured and the following are the results obtained from such testing.

| F (pounds) | B (deflection in inches) |
|---|---|
| 10 | .130 |
| 20 | .260 |
| 30 | .370 |
| 40 | .440 |
| 50 | .560 |
| 60 | .720 |
| 70 | .850 |
| 80 | 1.030 |
| 90 | 1.150 |
| 100 | 1.380 |
| 140 | 2.500 |

The internal diameter of the tubular segment 14 in this particular embodiment was 0.830 inches. The interior diameter of the cylindrical sleeve portion of the elastomeric sleeve 56 was 0.720 inches and the outer diameter thereof was 0.830 inches. The material of the bracket member 316 was 11-gauge steel. Further, and with all testing discussed herein, the wheel 13 was 5 inches in diameter.

ALTERNATE EMBODIMENT OF FIGS. 15-17

The embodiment of FIGS. 15 to 17 is similar in many respects to the embodiment of FIGS. 2 to 4 and, as a result, the same reference numerals will be used to designate similar or identical structure described in relation to FIGS. 2 to 4 but with a "4" prefix added thereto. That is, the bracket member 416 has a cylindrical stem section 418 and a flat, platelike, axle mounting section 417 separated by a bulbously contoured intermediate section 423. The primary differences between this embodiment and the embodiment of FIGS. 2 to 4 is the orientation of the flat, platelike, axle mounting section 417 in a plane which is inclined to the vertical. In this particular embodiment, the plane of the flat, platelike, axle mounting section 417 is, as with the previously discussed embodiments, parallel to the plane of rotation of the wheel 13A. The axis 29 of the axle for the wheel extends perpendicular to the plane of the axle mounting section 417. The plane of rotation P1 for the wheel 13A is inclined to the vertical by an angle $\beta$ equal to 3° to 5°.

The tread of the wheel 13A is configured so that the entire width of the tread 61 engages the ground even though the plane of rotation P1 thereof is inclined to the vertical by the aforementioned angle β. In all other respects, the wheel 13A is identical to the wheel 13 disclosed in the embodiment relating to FIGS. 2 to 4.

Another feature that is different in this embodiment is that the bracket member 416 is located on the outside of the wheel when it is mounted on a wheeled vehicle, such as the wheeled vehicle 10 illustrated in FIG. 1. In the previously discussed embodiments, the bracket member 16 was, in each instance, mounted on the inside of the wheel. I have provided a bracket member 416 capable of supporting the wheel on the inside thereof so that the exterior of the wheel supported vehicle will appear the same as conventional rear brackets except that the bracket member 416 is comprised of a single piece of steel. In this particular embodiment, the axis 37 of the cylinder 419 defined by the stem section 418 is contained in a plane which extends parallel to the longitudinal axis of the wheeled vehicle 10 and is oriented in an obtuse angle α relative to the plane of rotation P1 for the wheel 13A. In this particular embodiment, the angle α is in the range of 175° to 177°, namely, the complement to the angle β. The purpose behind inclining the plane of rotation P1 for the wheel 13A to the vertical is to provide additional space between the mutually adjacent portions of the tread 61 and the surface of the bracket member 16. Since relative movement capability exists between the wheel 13A and the bracket member 16 due to the particular bearing support in the wheel 13A, sufficient space has to be provided to enable the wheel to move relative to the bracket member 416 without causing the tread 61 to scrub against the inside surface portion of the intermediate section 423 when the wheel is flexed to the broken line position shown in FIG. 15.

ALTERNATE EMBODIMENT OF FIGS. 18–20

In certain instances, it may be desirable to support the axle rotatably supporting a wheel from both ends thereof. Further, a particular customer may demand this type of support for the wheel even though the previously discussed embodiments will adequately tolerate most abuses rendered to a wheel bracket mounting structure. However, as explained above and with respect to the structure disclosed in my copending application Ser. No. 488,863, insufficient flex was possible between the wheel bracket mounting structure and the tubular segment before plastic deformation occurred in the structure of the bracket members. I recognized in my earlier filed application Ser. No. 488,863 that an elastomeric sleeve could be placed around the stem section to enhance the relative movement characteristic between the bracket members and the tubular segment. In this particular instance, the following test results occurred when a force was applied to the tread of a wheel shown in FIG. 12 in my aforementioned copending application to cause a flexing of the plane of rotation P1 to an alternate position P2 thereof. A 5 inch diameter wheel was used on this testing.

| F (pounds) | B (deflection in inches) |
|---|---|
| 10 | .305 |
| 20 | .462 |
| 30 | .594 |
| 40 | .700 |

| F (pounds) | B (deflection in inches) |
|---|---|
| 50 | .810 |
| 60 | .913 |
| 70 | 1.015 |
| 80 | 1.090 |
| 90 | 1.180 |
| 100 | 1.280 |
| 110 | 1.380 |
| 120 | 1.468 |

Figure 18:
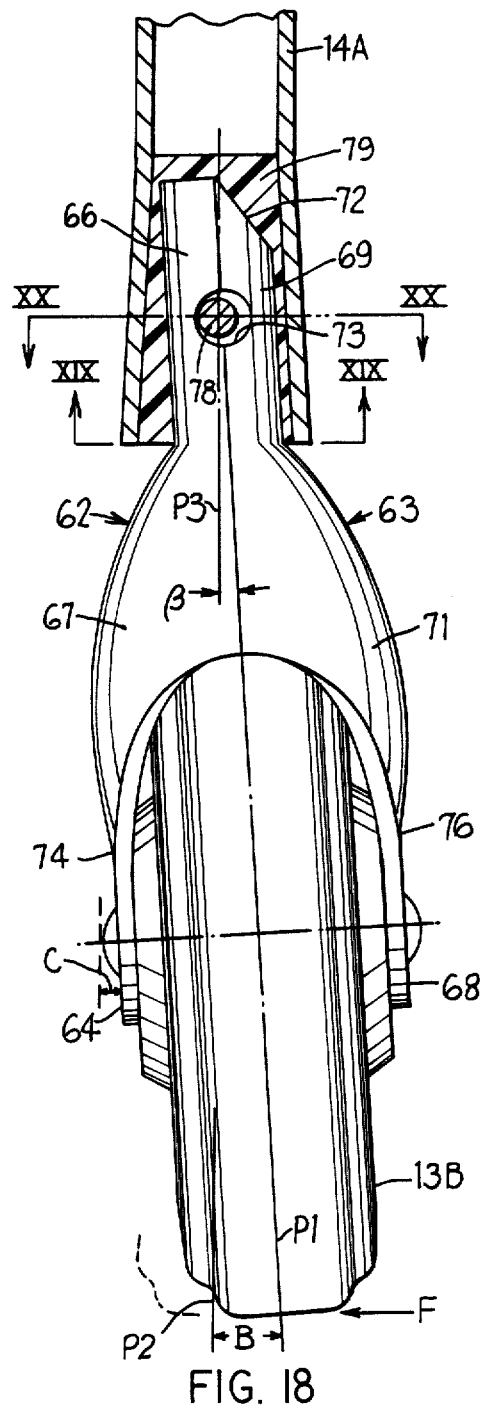
FIG. 18 is a front elevational view of an eighth embodiment of the wheel bracket mounting structure embodying the invention.
Figure 19:
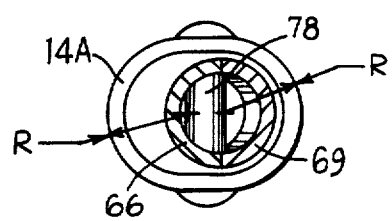
FIG. 19 is a sectional view taken along the line XIX—XIX of FIG. 18.
Figure 20:
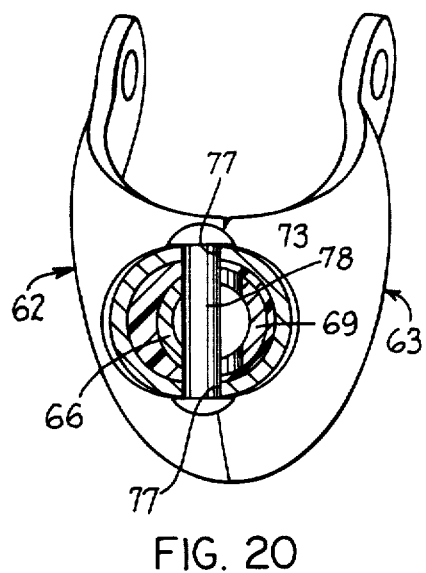
FIG. 20 is a sectional view taken along the line XX—XX of FIG. 18.

In this test, the material of the bracket members was 11-gauge steel and the diameter of the stem section was 0.720 inches and the exterior diameter of the elastomeric sleeve was 0.830 inches, namely, the same as the internal diameter of the tubular segment 14. This particular construction has been satisfactory for most uses discovered to date. However, there are certain applications wherein larger forces must be absorbed in order to prevent plastic deformation of the bracket members. FIGS. 18 to 20 represent my improvement over the earlier structures disclosed in the aforementioned application Ser. No. 488,863.

Referring now more specifically to the structure of FIGS. 18 to 20, the wheel bracket mounting structure consists of a pair of bracket members 62 and 63 which are the mirror image of each other. The bracket member 62 has a flat, platelike, axle mounting section 64 and a semicylindrically shaped stem section 66 separated from the axle mounting section by a bulbously contoured intermediate section 67. The bracket 63 also has a flat, platelike, axle mounting section 68 as well as a semicylindrically shaped stem section 69 separated from the axle mounting section by a bulbously contoured intermediate section 71. In this particular embodiment, the stem section 69 has a section thereof adjacent the upper edge which is removed to form an inclined edge 72. In addition, a single opening 73 is provided in the stem sections 66 and 69, the axis of which extends in an upright vertical plane parallel to the longitudinal axis of a wheeled vehicle on which the wheel bracket mounting structure is secured. In this particular embodiment, the plane is identified by the reference character P3 in FIG. 18.

As with the previously discussed embodiments, the intermediate sections 67 and 71 of both bracket members 62 and 63, respectively, have a greater resistance to lateral flex than the junctures 74 and 76, respectively, between the aforesaid intermediate sections 67 and 71 and the associated axle mounting sections 64 and 68. However, an axle is secured to and extends between the axle mounting sections to eliminate the elastic flex at the junctures 74 and 76.

The wheel 13B oriented between the bracket members 62 and 63 can be of any construction including wheels having a hollow axle as opposed to a solid axle. One such wheel employing a hollow axle is disclosed in my U.S. Pat. No. 4,072,373.

An opening 77, smaller in diameter than the opening 73, is provided in diametrically opposite sides of the tubular segment 14A of the base frame of a wheeled vehicle, the axis of which also extends parallel to the plane P3. In the embodiments of FIGS. 2 to 17 discussed above, the axis of the rivets all extended perpendicular to the plane P1, namely, a plane corresponding to the aforementioned plane P3. Prior to insertion of the stem sections 66 and 69 into the interior of the tubular segment 14A, the lower end of the tubular segment 14A is enlarged as best illustrated in FIG. 19. That is, the lower end of the tubular segment 14A has a generally elliptical shape wherein the left and right halves of the opening have a radius R with the centerpoints of each radii being spaced apart approximately the diameter of the central portion of the rivet 78 as best illustrated in FIG. 19. During assembly of the bracket members 62 and 63 to the tubular segment 14, the opening 73 is aligned with the opening 77 and a rivet 78 is inserted therein. The enlarged opposite ends on the rivet 78 are best illustrated in FIG. 20. An elastomeric sleeve 79 is provided and encircles the stem sections 66 and 69. In this particular embodiment, the plane of rotation P1 of the wheel 13B is oriented at an angle $\beta$ relative to an upright vertical plane extending parallel to the longitudinal axis of a wheeled vehicle on which such wheel is mounted. In this particular embodiment, the angle $\beta$ is oriented in the range of 3° to 5° from the vertical as illustrated in FIG. 18. The elastomeric sleeve 79 occupies the space between the peripheral surface of the stem sections 66 and 69 and the internal surface of the tubular segment 14A. Since the stem sections 66 and 69 forming a cylinder are inclined to the vertical, the elastomeric sleeve 79 has a special shape to fill the space between the exterior cylindrical surface formed by the stem sections 66 and 69 and the interior of the enlarged lower segment of the tubular segment 14A. As illustrated in FIG. 19, the elastomeric sleeve 79 will have a uniform thickness around the stem section 69 but a varying and enlarged thickness around the stem section 66.

The elastomeric member in this embodiment, as in all other embodiments described herein, is made of a polyurethane having a hardness value in the range of 75 Shore A to 55 Shore D Durometer.

The embodiment of FIGS. 18 to 20 was subjected to a test wherein a force was applied to the tread in the direction of the arrow F illustrated in FIG. 18. The deflection of the plane of rotation from the position P1 to alternate positions illustrated by the plane P2 was measured. In addition, the amount of lateral movement C of the bracket members 62 and 63, particularly, the axle mounting sections 64 and 68, were noted. The following test results were obtained. A 5 inch diameter wheel was used in this testing.

| F (pounds) | B (deflection in inches) | C (in inches) |
|---|---|---|
| 10 | .100 | .070 |
| 15 | .200 | .150 |
| 20 | .320 | .230 |
| 25 | .465 | — |
| 30 | .675 | — |
| 35 | .860 | .275 |
| 40 | .970 | .355 |
| 45 | 1.078 | .460 |
| 50 | 1.198 | .520 |
| 55 | 1.275 | .575 |
| 60 | 1.355 | .630 |
| 65 | 1.430 | .685 |
| 70 | 1.475 | .717 |
| 75 | 1.532 | .757 |
| 80 | 1.621 | .830 |
| 85 | 1.695 | .860 |
| 90 | 1.760 | .880 |
| 95 | 1.830 | .940 |
| 100 | 1.970 | — |
| 110 | 2.045 | — |
| 120 | 2.155 | — |
| 130 | 2.340 | — |
| 140 | 2.500 | — |

The material of the bracket members 62 and 63 comprised 12-gauge steel and the wheel 13B was 5 inches in diameter. Further, the specific angle of the plane P1 relative to the vertical plane P3 at the start of the test was 3°. Further, the upper section of the tubular segment 14A had an interior diameter of 0.830 inches. The lower internal dimension of the tubular segment 14A, from left to right in FIG. 19, was 1.03 inches. In other words, there was a 0.100 inch flare on each side of the tubular segment from the central axis of the tubular segment 14A. Thus, the amount of lateral flex achieved by the embodiment of FIGS. 18 to 20 was more than twice that amount obtained by the FIG. 2 structure and more than 50 percent that amount obtained by the FIG. 12 structure disclosed in my aforementioned earlier filed application Ser. No. 488,863 and as evidenced by the data presented hereinabove.

Although particular preferred embodiments of the invention have been disclosed in detail for illustrative purposes, it will be recognized that variations or modifications of the disclosed apparatus, including the rearrangement of parts, lie within the scope of the present invention.

The embodimennts of the invention in which an exclusive property or privilege is claimed are defined as follows:

1. A wheel bracket mounting structure, comprising:
   a unitary elongated bracket member including a single axle mounting section to secure only one end of an axle member and a stem mounting section at generally opposite ends thereof, said axle mounting section including first means defining a generally flat, platelike portion vertically and horizontally offset from said stem mounting section, said axle member being rigidly secured and cantileverd to said flat, platelike portion, the axis of said axle member extending generally perpendicularly to the plane of said flat, platelike portion, said stem mounting section including second means defining an elongate stem means generally arcuate in cross-section adapted to be directly attached to a support member on a wheeled vehicle, said bracket member further including a first bulbously shaped structure means intermediate said first and second means for providing a smooth transition therebetween for resisting lateral elastic flexing so that said stem mounting section and said first bulbously shaped structure means are resistant to relative lateral elastic flexing, said stem mounting section and said first bulbously shaped structure means consisting of a majority of the length of said bracket member, and third means defining a region at the juncture between said flat, platelike portion and said first bulbously shaped structure means for allowing the material of said bracket in said region at said juncture to elastically flex relative to said first bulbously shaped structure means and said stem mounting section, said first bulbously shaped structure means and said stem mounting section having a greater resistance to lateral elastic flex characteristic than said region.

2. The wheel bracket mounting structure according to claim 1, including a wheel and bearing means rotatably supporting said wheel on said axle member; and wherein stop means are provided on said axle member for preventing axial movement of said wheel in a direction away from said flat, platelike portion, whereby said axle is movable with said flat, platelike portion during said elastically flex movement thereof.

3. The wheel bracket mounting structure according to claim 1, wherein said bracket member is made of a single piece of uniformly thick, high carbon steel, heat treated and drawn to a Rockwell hardness in the range of 45 to 55 Rockwell C.

4. The wheel bracket mounting structure according to claim 1, wherein when said stem means is connected to a wheeled vehicle, said platelike portion being oriented in a vertical plane parallel to the longitudinal axis of said stem means.

5. The wheel bracket mounting structure according to claim 1, wherein when said stem means is connected to a wheeled vehicle, said platelike portion being oriented in a plane which is inclined to the vertical and out of parallel relationship to the longitudinal axis of said stem means.

6. The wheel bracket mounting structure according to claim 1, wherein
said first shaped structure means resists elastic flex in a direction radial to said axle segment.

7. The wheel bracket mounting structure according to claim 1, wherein when said stem means is connected to a wheeled vehicle, said platelike portion being oriented in a vertical plane parallel to the longitudinal axis of said stem means; and
wherein said axle member extends from a side of said platelike portion thereby orienting a central plane of said wheel rotatably mounted thereon in alignment with the longitudinal axis of said stem means.

8. The wheel bracket mounting structure according to claim 1, wherein when said stem means is connected to a wheeled vehicle, said platelike portion being oriented in a vertical plane parallel to the longitudinal axis of said stem means;
wherein said axial member extends from a side of said platelike portion thereby orienting a central plane of said wheel rotatably mounted thereon at an obtuse angle greater than 170° but less than 180° to a vertially aligned plane containing said longitudinal axis of said stem means and oriented parallel to the rolling direction of said wheel about said axis of said axle member.

9. The wheel bracket mounting structure according to claim 8, wherein said obtuse angle is in the range of 175° to 177°.

10. The wheel bracket mounting structure according to claim 1, wherein said stem means includes the material of said bracket member bent into a closed, cylindrical form.

11. The wheel bracket mounting structure according to claim 8, wherein said stem means includes an elastomeric sleeve encircling said closed, cylindrical form.

12. The wheel bracket mounting structure according to claim 1, wherein said stem means includes the material of said bracket member bent into a first semicylindrical segment and a separate and second semicylindrical segment juxtaposed said first semicylindrical segment to thereby define a cylinder.

13. The wheel bracket mounting structure according to claim 10, wherein said second semicylindrical segment includes means defining a skirt integrally secured thereto and having a shape mirror imaging at least a portion of said third means adjacent said stem mounting section.

14. The wheel bracket mounting structure according to claim 1, wherein said stem means includes the material of said bracket member bent into a semicylindrical segment and an elastomeric member having a first portion filling the space between the legs of said semicylindrical segment and a second portion integral with said first portion having a shape conforming to the shape of said semicylindrical segment to thereby form a cylinder.

15. The wheel bracket mounting structure according to claim 1, wherein said stem means includes the material of said bracket member bent into a C shape, the legs of which lie in spaced and parallel planes, and an elastomeric member having a first portion filling the space between said legs of said C-shaped member and a second portion integral with said first portion having a shape conforming to the shape of a portion of said C-shaped member to at least define a cylinder.

16. The wheel bracket mounting structure according to claim 13, wherein the upper region of the vertically extending edges of said legs are inclined to the vertical toward a bight portion of said C-shaped member extending between said parallel legs.

17. A wheel bracket mounting structure, comprising
a unitary elongated bracket member including an axle mounting section and a stem mounting section at generally opposite ends thereof, said axle mounting section including first means defining a generally flat, platelike portion vertically and horizontally offset from said stem mounting section, said stem mounting section including second means defining an elongate stem means generally arcuate in cross-section adapted to be directly attached to a support member on a wheeled vehicle, said bracket member further including a first bulbously shaped structure means intermediate said first and second means for providing a smooth transition therebetween for resisting lateral elastic flexing so that said stem mounting section and said first bulbously shaped structure means are resistant to relative lateral elastic flexing, said stem mounting section and said first bulbously shaped structure means consisting of a majority of the length of said bracket member, and third means defining a region at the juncture between said flat, platelike portion and said first bulbously shaped structure means for allowing the material of said bracket in said region at said juncture to elastically flex relative to said first bulbously shaped structure means and said stem mounting section, said first bulbously shaped structure means and said stem mounting section having a greater resistance to lateral elastic flex characteristic than said region.

18. A wheel bracket mounting structure according to claim 17, including an axle member rigidly secured and cantilevered to said flat, platelike portion, the axis of said axle member extending generally perpendicularly to the plane of said flat, platelike portion.

19. The wheel bracket mounting structure according to claim 17, including a further elongated bracket member that is a mirror image to the first mentioned bracket member, said bracket members each having a semicylindrical stem mounting section and a bulbously contoured first shaped structure means providing said smooth transition between said stem mounting section and said axle mounting section, said bracket members being oriented side-by-side so that said semicylindrical stem mounting sections define a cylinder and said axle mounting sections are horizontally spaced from each other, an axle fixedly connected to and extending between said axle mounting sections and a wheel rotatably supported on said axle.

20. The wheel bracket mounting structure according claim 17, wherein said axle and its connection to said axle supporting sections eliminates the elastic flex at said juncture.

21. The wheel bracket mounting structure according to claim 20, wherein an elastomeric member encircles said cylinder and is received in a downwardly opening and vertically oriented tubular segment on a wheeled vehicle, and wherein pivot means are provided for pivotally securing said bracket members to said tubular segment, said elastomeric member yieldably resisting pivotal movement of said bracket members.

22. The wheel bracket mounting structure according to claim 21, wherein said pivot means includes an axis which extends parallel to a plane of rotation of said wheel.

23. The wheel bracket mounting structure according to claim 21, wherein the lower end portion of said tubular segment is flared outwardly in directions lateral to a plane of rotation of said wheel; and wherein said plane of rotation of said wheel and the axis of said cylinder are oriented at an acute angle to the vertical; and wherein said elastomeric member is formed to occupy the space between said cylinder and the internal wall of said flared part of said tubular segment.

* * * * *

UNITED STATES PATENT AND TRADEMARK OFFICE
CERTIFICATE OF CORRECTION

PATENT NO. : 4,709,444

DATED : December 1, 1987

INVENTOR(S) : John W. Black

It is certified that error appears in the above-identified patent and that said Letters Patent is hereby corrected as shown below:

Column 5, line 6; change "ax;e" to ---axle---.

Column 15, line 53; change "claim 8" to ---claim 10---.

Column 15, line 62; change "claim 10" to ---claim 12---.

Column 16, line 17; change "claim 13" to ---claim 15---.

Signed and Sealed this

Fifth Day of July, 1988

Attest:

DONALD J. QUIGG

Attesting Officer

Commissioner of Patents and Trademarks